(12) United States Patent
Ekstrand et al.

(10) Patent No.: US 9,495,019 B2
(45) Date of Patent: Nov. 15, 2016

(54) DISPLAY METHOD OF MOBILE DEVICE SELECTION AND TERMINAL DEVICE

(71) Applicants: Huawei Technologies Co., Ltd., Shenzhen, Guangdong (CN); Simon Ekstrand, Eslov (SE)

(72) Inventors: Simon Ekstrand, Eslov (SE); Cheng Cheng, Shenzhen (CN)

(73) Assignees: Huawei Technologies Co., Ltd., Shenzhen (CN); Simon Ekstrand, Eslov (SE)

( * ) Notice: Subject to any disclaimer, the term of this patent is extended or adjusted under 35 U.S.C. 154(b) by 45 days.

(21) Appl. No.: 14/587,144

(22) Filed: Dec. 31, 2014

(65) Prior Publication Data

US 2015/0241994 A1 Aug. 27, 2015

(30) Foreign Application Priority Data

Feb. 25, 2014 (CN) .......................... 2014 1 0064984

(51) Int. Cl.
| | |
|---|---|
| *G06F 3/0346* | (2013.01) |
| *G06F 3/0482* | (2013.01) |
| *G06F 3/0481* | (2013.01) |
| *G06F 3/0484* | (2013.01) |

(52) U.S. Cl.
CPC .......... *G06F 3/0346* (2013.01); *G06F 3/0482* (2013.01); *G06F 3/0484* (2013.01); *G06F 3/04812* (2013.01); *G06F 3/04817* (2013.01); *G06F 2203/04801* (2013.01)

(58) Field of Classification Search
CPC ................. G06F 2203/04801; G06F 3/0346; G06F 3/04812; G06F 3/04817; G06F 3/0482; G06F 3/0484
USPC ........................................................ 345/156
See application file for complete search history.

(56) References Cited

U.S. PATENT DOCUMENTS

| | | | |
|---|---|---|---|
| 5,736,974 A | 4/1998 | Selker | |
| 5,805,165 A | 9/1998 | Thorne, III et al. | |
| 5,808,601 A | 9/1998 | Leah et al. | |
| 5,999,895 A * | 12/1999 | Forest | G06F 3/0236 382/185 |
| 6,005,549 A * | 12/1999 | Forest | G06F 3/011 345/157 |
| 6,750,803 B2 | 6/2004 | Yates et al. | |
| 8,441,369 B2 | 5/2013 | Park et al. | |
| 2009/0027337 A1 * | 1/2009 | Hildreth | G06F 3/011 345/158 |
| 2009/0141184 A1 | 6/2009 | Gulati | |
| 2009/0153289 A1 | 6/2009 | Hope et al. | |
| 2012/0089940 A1 | 4/2012 | Jang et al. | |

(Continued)

FOREIGN PATENT DOCUMENTS

| | | |
|---|---|---|
| CN | 101097497 A | 1/2008 |
| CN | 102096587 A | 6/2011 |

(Continued)

*Primary Examiner* — Viet Pham
(74) *Attorney, Agent, or Firm* — Leydig, Voit & Mayer, Ltd.

(57) ABSTRACT

The present invention provides a display method of a mobile device selection and a terminal device. The method includes: receiving a location movement signal sent by a mobile device; determining a location, of a cursor focus of the mobile device, on a screen according to the location movement signal; and determining that the cursor focus moves toward a target icon, and if a distance between the cursor focus and the target icon is greater than zero and is less than or equal to a first threshold, determining that the cursor focus selects the target icon, thereby improving user operation efficiency, reducing operation complexity, and ensuring desirable interaction experience of a user.

10 Claims, 2 Drawing Sheets

(56) References Cited

U.S. PATENT DOCUMENTS

| | | |
|---|---|---|
| 2012/0162536 A1 | 6/2012 | Sibilsky et al. |
| 2012/0200497 A1 | 8/2012 | Nasiri et al. |
| 2013/0252732 A1 | 9/2013 | Abeloe |
| 2014/0047392 A1* | 2/2014 | Kim .................. G06F 3/04812 715/846 |
| 2015/0193124 A1* | 7/2015 | Schwesinger ....... G06F 3/04812 715/863 |

FOREIGN PATENT DOCUMENTS

| | | |
|---|---|---|
| EP | 2157498 A1 | 2/2010 |
| WO | WO 2009073299 A1 | 6/2009 |

* cited by examiner

DISPLAY METHOD OF MOBILE DEVICE SELECTION AND TERMINAL DEVICE

CROSS-REFERENCE TO RELATED APPLICATIONS

This application claims priority to Chinese Patent Application No. 201410064984.X, filed on Feb. 25, 2014, which is hereby incorporated by reference in its entirety.

TECHNICAL FIELD

Embodiments of the present invention relate to the field of information technologies, and in particular, to a display method of a mobile device selection and a terminal device.

BACKGROUND

In the field of home entertainment, televisions and the Internet are combined more and more closely, and more wonderful content is presented television screens. Regarding a requirement for television manipulation, a user hopes for easy operation, easy interaction, and the like.

Currently, a wireless mouse technology is an advanced technology in television operation. This technology uses gravity sensing and gyroscope technologies built in a wireless mouse to determine a displacement and a moving direction of the mouse, so that a mobile cursor moves on a television screen and an icon is selected after the cursor of the wireless mouse moves onto the icon. However, in the foregoing mouse selection process, operation efficiency is low and user experience is unsatisfying.

SUMMARY

The present invention provides a focus display method and a terminal device, thereby improving user operation efficiency, reducing operation complexity, and ensuring desirable interaction experience of a user.

According to a first aspect, an embodiment of the present invention provides a display method of a mobile device selection, including: receiving a location movement signal sent by a mobile device; determining a location, of a cursor focus of the mobile device, on a screen according to the location movement signal; and determining that the cursor focus moves toward a target icon, and if a distance between the cursor focus and the target icon is greater than zero and is less than or equal to a first threshold, determining that the cursor focus selects the target icon.

With reference to the first aspect, in a first possible implementation manner of the first aspect, after the determining that the cursor focus moves toward the target icon, the method further includes: if the distance between the cursor focus and the target icon is less than or equal to the first threshold, dynamically displaying, on the screen, that the target icon adsorbs the cursor focus.

With reference to the first aspect or the first possible implementation manner of the first aspect, in a second possible implementation manner of the first aspect, after the determining that the cursor focus moves toward the target icon, the method further includes: if the distance between the cursor focus and the target icon is less than or equal to a second threshold, dynamically displaying, on the screen, a change of the cursor focus, and/or dynamically displaying, on the screen, a change of the target icon, where the second threshold is greater than or equal to the first threshold.

With reference to the second possible implementation manner of the first aspect, in a third possible implementation manner of the first aspect, the change of the cursor focus includes: at least one of a size change of the cursor focus, a shape change of the cursor focus, and a color change of the cursor focus.

With reference to the second possible implementation manner of the first aspect or the third possible implementation manner of the first aspect, in a fourth possible implementation manner of the first aspect, for any target icon, the corresponding first threshold changes according to at least one of user information and time information; and for any target icon, the corresponding second threshold changes according to at least one of the user information and the time information.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, before the receiving the location movement signal sent by the mobile device, the method further includes: receiving a triggering signal sent by the mobile device and displaying the cursor focus on the screen.

According to a second aspect, an embodiment of the present invention provides a terminal device, including: a receiving unit, configured to receive a location movement signal sent by a mobile device; a determining unit, configured to determine a location, of a cursor focus of the mobile device, on a screen according to the location movement signal; and a judging unit, configured to determine that the cursor focus moves toward a target icon, and if a distance between the cursor focus and the target icon is greater than zero and is less than or equal to a first threshold, determine that the cursor focus selects the target icon.

With reference to the second aspect, in a first possible implementation manner of the second aspect, the terminal device further includes a display unit, configured to: after the judging unit determines that the cursor focus moves toward the target icon, if the distance between the cursor focus and the target icon is less than or equal to the first threshold, the display unit dynamically displays, on the screen, that the target icon adsorbs the cursor focus.

With reference to the second aspect or the first possible implementation manner of the second aspect, in a second possible implementation manner of the second aspect, the display unit is further configured to: after the judging unit determines that the cursor focus moves toward the target icon, if the distance between the cursor focus and the target icon is less than or equal to a second threshold, the display unit dynamically displays, on the screen, a change of the cursor focus, and/or dynamically displays, on the screen, a change of the target icon, where the second threshold is greater than or equal to the first threshold.

With reference to the second possible implementation manner of the second aspect, in a third possible implementation manner of the second aspect, the change of the cursor focus includes: at least one of a size change of the cursor focus, a shape change of the cursor focus, and a color change of the cursor focus.

With reference to the second possible implementation manner of the second aspect or the third possible implementation manner of the second aspect, in a fourth possible implementation manner of the second aspect, for any target icon, the corresponding first threshold changes according to at least one of user information and time information; and for any target icon, the corresponding second threshold changes according to at least one of the user information and the time information.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the receiving unit is further configured to: before receiving the location movement signal sent by the mobile device, receive a triggering signal sent by the mobile device and display the cursor focus on the screen.

According to a third aspect, an embodiment of the present invention provides a terminal device, including a memory, configured to store an instruction; and a processor, which communicates with the memory and is configured to run the instruction in the memory to execute the display method of a mobile device selection.

The present invention provides a display method of a mobile device selection and a terminal device. A location movement signal sent by a mobile device is received; a location, of a cursor focus of the mobile device, on a screen is determined according to the location movement signal; that the cursor focus moves toward a target icon is determined, and if a distance between the cursor focus and the target icon is greater than zero and is less than or equal to a first threshold, that the cursor focus selects the target icon is determined, so that user operation efficiency is improved, operation complexity is reduced, and satisfying interaction experience is provided for a user.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
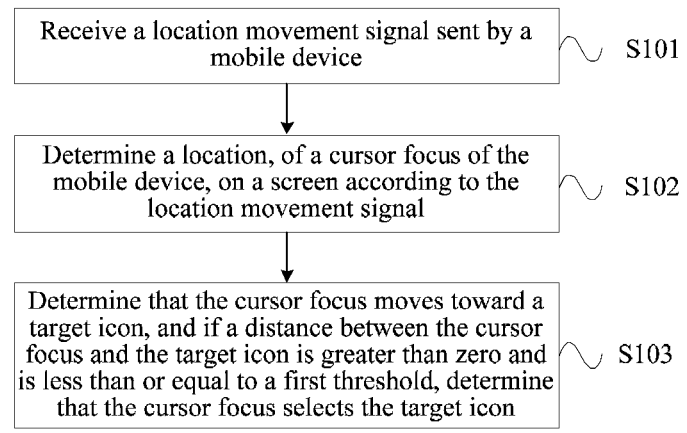
FIG. 1 is a flowchart of a display method of a mobile device selection according to an embodiment of the present invention.

FIG. 1 is a flowchart of a display method of a mobile device selection according to an embodiment of the present invention. The display method of a mobile device selection may be executed by various terminal devices, for example, a display device such as a television or a PC. A mobile device may be a smartphone, a wireless mouse, or the like.

As shown in FIG. 1, specific steps of the method include:

S101: Receive a location movement signal sent by a mobile device.

The mobile device may have a component for detecting location information, such as a sensor or a gyroscope. The component may convert location information of the mobile device into a location movement signal and send the signal, where the sent location movement signal is a wireless signal, and the location movement signal is received by a terminal device such as a television. A user may select a target icon on a television screen by using the location movement signal sent by the mobile device.

Optionally, the user may trigger a remote control operation by pressing a key on the mobile device, and the key pressing operation may generate and send a triggering signal. After receiving the triggering signal, a terminal device such as a television may display a cursor focus on a screen.

S102: Determine a location, of the cursor focus of the mobile device, on the screen according to the location movement signal.

The terminal device receives the location movement signal sent by the mobile device, and parses the movement location signal to determine the location of the cursor focus on the screen. In this way, the mobile device sends different location movement signals in a process of continuous location change, so that the cursor focus correspondingly moves on the screen.

S103: Determine that the cursor focus moves toward a target icon, and if a distance between the cursor focus and the target icon is greater than zero and is less than or equal to a first threshold, determine that the cursor focus selects the target icon.

The terminal device determines, according to the location movement signal, an icon toward which the cursor focus moves, and may determine a target cursor by using a relative location between the cursor focus and an icon or a moving direction of the cursor focus. A method for determining the target icon is not limited herein. After determining that the cursor focus moves toward the target icon, the terminal device calculates the distance between the cursor focus and the target icon, and if the distance between the cursor focus and the target icon is greater than zero and is less than or equal to the first threshold, determines that the cursor focus selects the target icon. When distances between the cursor focus and the target icon in all directions are greater than zero and are less than or equal to the first threshold, it can be determined that the cursor focus selects the target icon. In other words, when the cursor focus enters an area with a central point of the target icon as a circle center and with the first threshold as a radius, it can be determined that the cursor focus selects the target icon.

Figure 2:
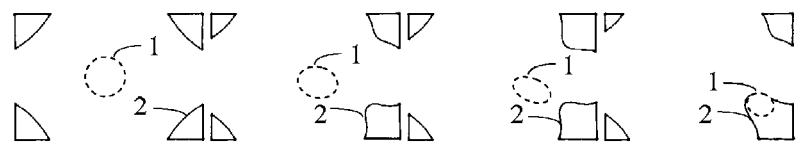
FIG. 2 is a schematic diagram in which a target icon adsorbs a cursor focus in a display method of a mobile device selection according to an embodiment of the present invention.

To improve user experience, optionally, after it is determined that the cursor focus moves toward the target icon, if the distance between the cursor focus and the target icon is greater than zero and is less than or equal to the first threshold, it may be further dynamically displayed on the screen that the target icon adsorbs the cursor focus. FIG. 2 is a schematic diagram in which a target icon adsorbs a cursor focus in a display method of a mobile device selection according to an embodiment of the present invention. As shown in a fourth diagram of FIG. 2, a specific "adsorption" effect dynamically displayed may be that: when a cursor focus enters an area with uses a central point of a target icon as a circle center and with a first threshold as a radius, a shape of the target icon is lengthened along a direction of the cursor focus and/or a shape of the cursor focus is lengthened along a direction of the target icon, the target icon and the cursor focus gradually converge, which is represented by the fact that the target icon adsorbs the cursor focus in a dynamic adsorption process, and after a user releases a key, the cursor focus directly selects the target icon.

Based on the foregoing embodiment, to further improve user experience and a dynamic display effect on the screen, after the terminal device determines that the cursor focus moves toward the target icon, if the distance between the cursor focus and the target icon is less than or equal to a second threshold, a change of the cursor focus may be dynamically displayed on the screen, and/or a change of the target icon is dynamically displayed on the screen, where the second threshold is greater than or equal to the first threshold. In other words, after the distance between the cursor focus and the target icon reaches a certain range, an effect of a change of the cursor focus, and/or an effect of a change of the target icon may be dynamically displayed. Optionally, the change of the cursor focus includes: at least one of a size change of the cursor focus, a shape change of the cursor focus, and a color change of the cursor focus.

Specifically, as shown in FIG. 2, from left to right, in a first diagram, a cursor focus 1 does not move, and then shapes of the cursor focus 1 and a target icon 2 do not change. In a second diagram and a third diagram, a distance between the cursor focus 1 and the target icon 2 is less than or equal to a second threshold, then the shape of the cursor focus 1 gradually changes on a screen, the shape of the target icon 2 also changes to some extent, and the cursor focus 1 and the target icon 2 are like bubbles with a gravitational force between them and continuously approach each other. In a fourth diagram, the distance between the cursor focus 1 and the target icon 2 is greater than zero and is less than or equal to the first threshold, where the second threshold is greater than or equal to the first threshold, then it is dynamically displayed on the screen that the target icon 2 adsorbs the cursor focus 1, and if the user releases the key of the mobile device, the target icon 2 is directly selected. Further, a process in which the cursor focus moves away from the target icon is opposite to a process in which the cursor focus approaches the target icon until the target icon is selected.

Figure 3:
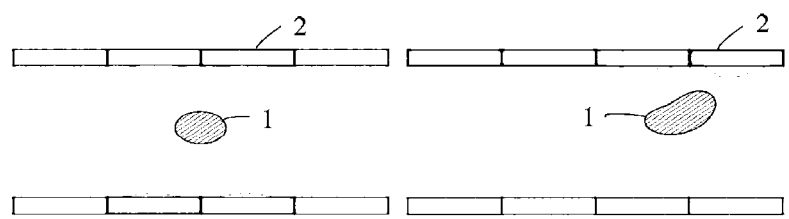
FIG. 3 is a schematic diagram of dynamic changes in size and shape of a cursor focus according to an embodiment of the present invention.
Figure 4:
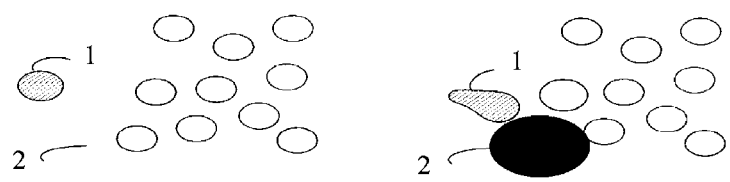
FIG. 4 is a schematic diagram of dynamic changes in size, shape, and color of a cursor focus according to an embodiment of the present invention.

FIG. 3 is a schematic diagram of dynamic changes in size and shape of a cursor focus according to an embodiment of the present invention. As shown in FIG. 3, after the cursor focus 1 enters an area of the target icon 2, namely, a round area with the target icon 2 as a circle center and with the second threshold as a radius, the size and shape of the cursor focus 1 change. In FIG. 3, shapes of both the cursor focus 1 and the target icon 2 change. FIG. 4 is a schematic diagram of dynamic changes in size, shape, and color of a cursor focus according to an embodiment of the present invention. As shown in FIG. 4, after the cursor focus 1 enters an area of the target icon 2, namely, a round area with the target icon 2 as a circle center and with the second threshold as a radius, the size, shape, and color of the cursor focus 1 change.

Optionally, for any target icon, a corresponding first threshold changes according to at least one of user information and time information.

For any target icon, a corresponding second threshold changes according to at least one of the user information and the time information.

Specifically, because users are of different ages, and television programs they watch may be presented in different time periods, the first threshold and the second threshold correspondingly change according to the user information and the time information. The user information may be obtained by collecting statistics on previous empirical data, or a terminal device recognizes users by using a sensor or the like to obtain the user information. A method for obtaining the user information is not limited herein. For example, if a child operates before a television to select a television program, the television predicts, according to existing data, that a probability that the child watches a cartoon is greater than a probability that the child watches a TV series, a news program, or the like, so that it is easier for a cartoon target icon to adsorb a cursor focus, and consequently the first threshold and the second threshold are correspondingly large in this case. In addition, usually a probability that a user watches a movie in the morning is less than a probability that the user watches a movie at night, for a movie target icon, a first threshold and a second threshold in the morning are less than a first threshold and a second threshold at night. In addition, the size of the cursor focus is inversely proportional to the number of target icons, so that the cursor can effectively point to a target icon.

This embodiment provides a display method of a mobile device selection, in which a terminal device determines a location, of a cursor focus of a mobile device, on a screen according to a location movement signal, determines that the cursor focus moves toward a target icon, and if a distance between the cursor focus and the target icon is greater than zero and is less than or equal to a first threshold, determines that the cursor focus selects the target icon, thereby improving user operation efficiency, reducing operation complexity, and ensuring desirable interaction experience of a user.

Figure 5:
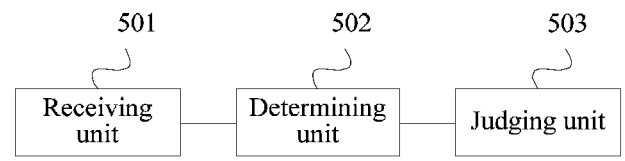
FIG. 5 is a schematic structural diagram of a terminal device according to another embodiment of the present invention.

FIG. 5 is a schematic structural diagram of a terminal device according to another embodiment of the present invention. The terminal device includes a receiving unit 501, a determining unit 502, and a judging unit 503. The receiving unit 501 is configured to receive a location movement signal sent by a mobile device. The mobile device may have a component for detecting location information, such as a sensor or a gyroscope. The component may convert location information of the mobile device into a location movement signal and send the signal, where the sent location movement signal is a wireless signal, and the location movement signal is received by the receiving unit 501 of the terminal device such as a television. A user may select a target icon on a television screen by using the location movement signal sent by the mobile device. The determining unit 502 is configured to determine a location, of a cursor focus of the mobile device, on a screen according to the location movement signal. When the receiving unit 501 receives the location movement signal sent by the mobile device, the determining unit 502 determines the location of the cursor focus on the screen. The receiving unit 501 receives the location movement signal sent by the mobile device, and parses the movement location signal, and then the determining unit 502 determines the location of the cursor focus on the screen. In this way, the mobile device sends different location movement signals in a process of continuous location change, so that the cursor focus correspondingly moves on the screen. The judging unit 503 is configured to determine that the cursor focus moves toward a target icon, and if a distance between the cursor focus and the target icon is greater than zero and is less than or equal to a first threshold, determine that the cursor focus selects the target icon. Specifically, the judging unit 503 determines, according to the location movement signal, an icon toward which the cursor focus moves, and may determine a target cursor according to a relative location between the cursor focus and an icon or a moving direction of the cursor focus. A method for determining the target icon is not limited herein. After determining that the cursor focus moves toward the target icon, the judging unit 503 calculates the distance between the cursor focus and the target icon, and if the distance between the cursor focus and the target icon is greater than zero and is less than or equal to the first threshold, determines that the cursor focus selects the target icon. When distances between the cursor focus and the target icon in all directions are greater than zero and are less than or equal to the first threshold, it can be determined that the cursor focus selects the target icon. In other words, when the cursor focus enters an area with a central point of the target icon as a circle center and with the first threshold as a radius, it can be determined that the cursor focus selects the target icon.

This embodiment provides a terminal device, which includes a receiving unit, a determining unit, and a judging unit. The determining unit determines a location, of a cursor focus of a mobile device, on a screen according to a location movement signal received by the receiving unit, and the judging unit determines that the cursor focus moves toward a target icon, and if a distance between the cursor focus and the target icon is greater than zero and is less than or equal to a first threshold, determines that the cursor focus selects the target icon, thereby improving user operation efficiency, reducing operation complexity, and ensuring desirable interaction experience of a user.

Figure 6:
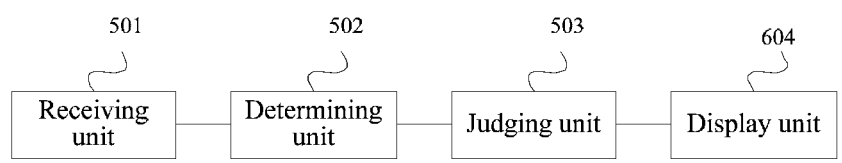
FIG. 6 is a schematic structural diagram of a terminal device according to still another embodiment of the present invention.

FIG. 6 is a schematic structural diagram of a terminal device according to still another embodiment of the present invention. Based on the previous embodiment, the terminal device provided by this embodiment further includes a display unit 604. The display unit 604 is configured to: after the judging unit 503 determines that the cursor focus moves toward the target icon, if the distance between the cursor focus and the target icon is greater than zero and is less than or equal to the first threshold, the display unit dynamically displays, on the screen, that the target icon adsorbs the cursor focus. The display unit 604 is further configured to: after the judging unit 503 determines that the cursor focus moves toward the target icon, if the distance between the cursor focus and the target icon is less than or equal to a second threshold, the display unit dynamically displays, on the screen, a change of the cursor focus, and/or dynamically displays, on the screen, a change of the target icon, where the second threshold is greater than or equal to the first threshold. Further, the change of the cursor focus includes: at least one of a size change of the cursor focus, a shape change of the cursor focus, and a color change of the cursor focus. In addition, for any target icon, a corresponding first threshold changes according to at least one of user information and time information, and for any target icon, a corresponding second threshold changes according to at least one of the user information and the time information. The receiving unit 501 is further configured to: before receiving the location movement signal sent by the mobile device, receive a triggering signal sent by the mobile device and display the cursor focus on the screen.

The terminal device in this embodiment may be configured to execute the technical solution for implementing a display method of a mobile device selection, and the implementation principle and technical effect thereof are similar and are not described again herein.

This embodiment provides a terminal device, including a receiving unit, a determining unit, a judging unit, and a display unit. If a distance between a cursor focus and a target icon is greater than zero and is less than or equal to a first threshold, the display unit dynamically displays, on a screen, that the target icon adsorbs the cursor focus; and if the distance between the cursor focus and the target icon is less than or equal to a second threshold, the display unit dynamically displays, on the screen, a change of the cursor focus, and/or dynamically displays, on the screen, a change of the target icon, thereby improving user operation efficiency, reducing operation complexity, and ensuring desirable interaction experience of a user.

Figure 7:
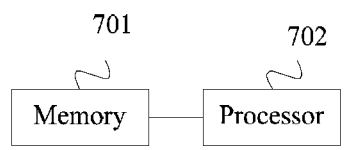
FIG. 7 is a schematic structural diagram of a terminal device according to yet another embodiment of the present invention.

FIG. 7 is a schematic structural diagram of a terminal device according to yet another embodiment of the present invention. The terminal device may include: a memory 701 and a processor 702. The memory 701 is configured to store an instruction. The processor 702 communicates with the memory and is configured to run the instruction in the memory to execute the display method of a mobile device selection in Embodiment 1. Specifically, the processor 702 is configured to receive a location movement signal sent by a mobile device; determine a location, of a cursor focus of the mobile device, on a screen according to the location movement signal; and determine that the cursor focus moves toward a target icon, and if a distance between the cursor focus and the target icon is greater than zero and is less than or equal to a first threshold, determine that the cursor focus selects the target icon. Further, after it is determined that the cursor focus moves toward the target icon, further including: if the distance between the cursor focus and the target icon is greater than zero and is less than or equal to the first threshold, dynamically displaying, on the screen, that the target icon adsorbs the cursor focus; and further including: if the distance between the cursor focus and the target icon is less than or equal to a second threshold, dynamically displaying, on the screen, that the cursor focus changes, and/or dynamically displaying, on the screen, that the target icon changes, where the second threshold is greater than or equal to the first threshold. The change of the cursor focus includes: at least one of a size change of the cursor focus, a shape change of the cursor focus, and a color change of the cursor focus. In addition, for any target icon, a corresponding first threshold changes according to at least one of user information and time information, and for any target icon, a corresponding second threshold changes according to at least one of the user information and the time information. In addition, before the location movement signal sent by the mobile device is received, further including: receiving a triggering signal sent by the mobile device and displaying the cursor focus on the screen.

The terminal device in this embodiment may be configured to execute the technical solution for implementing a display method of a mobile device selection, and the implementation principle and technical effect thereof are similar and are not described again herein.

This embodiment provides a terminal device, including a memory and a processor. The memory is configured to store an instruction. The processor communicates with the memory and is configured to run the instruction in the memory to execute a display method of a mobile device selection, thereby improving user operation efficiency, reducing operation complexity, and ensuring desirable interaction experience of a user.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method of displaying a mobile device selection, comprising:
    receiving a location movement signal sent by a mobile device;
    determining a location, of a cursor focus of the mobile device, on a display screen according to the location movement signal;
    determining that the cursor focus moves toward a target icon, and
    if a distance between the cursor focus and the target icon is greater than zero and is less than or equal to a second threshold, dynamically displaying, on the display screen, a change of the cursor focus and a change of the target icon, wherein the change of the target icon includes that a shape of the target icon is lengthened along a direction of the cursor focus and wherein the change of the cursor focus includes that the cursor focus is lengthened along a direction of the target icon, and
    if a distance between the cursor focus and the target icon is greater than zero and is less than or equal to a first threshold determining that the cursor focus selects the target icon,
    wherein the second threshold is greater than or equal to the first threshold.

2. The method according to claim 1, after the determining that the cursor focus moves toward a target icon, further comprising:
    if the distance between the cursor focus and the target icon is less than or equal to the first threshold, dynamically displaying, on the display screen, that the target icon absorbs the cursor focus.

3. The method according to claim 1, wherein the change of the cursor focus further comprises: at least one of a size change of the cursor focus, and a color change of the cursor focus.

4. The method according to claim 1, wherein for any target icon, the corresponding first threshold changes according to at least one of user information and time information; and
    for any target icon, the corresponding second threshold changes according to at least one of the user information and the time information.

5. The method according to claim 1, before the receiving a location movement signal sent by a mobile device, further comprising:
    receiving a triggering signal sent by the mobile device; and
    displaying the cursor focus on the display screen.

6. A terminal device, comprising a processor and a non-transitory processor-readable medium having processor-executable instructions stored thereon, the processor-executable instructions including a plurality of units, the units including:
    a receiving unit, configured to receive a location movement signal sent by a mobile device;
    a determining unit, configured to determine a location, of a cursor focus of the mobile device, on a display screen according to the location movement signal;
    a judging unit, configured to determine that the cursor focus moves toward a target icon; and
    a display unit, configured to: after the judging unit determines that the cursor focus moves toward the target icon, if a distance between the cursor focus and the target icon is less than or equal to a second threshold, dynamically display, on the display screen a change of the cursor focus and a change of the target icon, wherein the change of the target icon includes that a shape of the target icon is lengthened along a direction of the cursor focus and wherein the change of the cursor focus includes that the cursor focus is lengthened along a direction of the target icon, and if the distance between the cursor focus and the target icon is greater than zero and is less than or equal to a first threshold, determine that the cursor focus selects the target icon,
    wherein the second threshold is greater than or equal to the first threshold.

7. The terminal device according to claim 6, wherein the display unit is further configured to: if the distance between the cursor focus and the target icon is less than or equal to the first threshold, dynamically display, on the display screen, that the target icon absorbs the cursor focus.

8. The terminal device according to claim 7, wherein the change of the cursor focus further comprises: at least one of a size change of the cursor focus, and a color change of the cursor focus.

9. The terminal device according to claim 7, wherein for any target icon, the corresponding first threshold changes according to at least one of user information and time information; and
    for any target icon, the corresponding second threshold changes according to at least one of the user information and the time information.

10. The terminal device according to claim 6, wherein the receiving unit is further configured to: before receiving the location movement signal sent by the mobile device, receive a triggering signal sent by the mobile device and display the cursor focus on the display screen.

* * * * *